(12) United States Patent
Drabon et al.

(10) Patent No.: US 9,254,726 B2
(45) Date of Patent: Feb. 9, 2016

(54) TRANSVERSE LEAF SPRING BEARING UNIT AND TRANSVERSE LEAF SPRING ARRANGEMENT FOR A MOTOR VEHICLE

(71) Applicant: Benteler Automobiltechnik GmbH, Paderborn (DE)

(72) Inventors: Rodscha Drabon, Salzkotten (DE); Jürgen Von Der Kall, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/675,090

(22) Filed: Mar. 31, 2015

(65) Prior Publication Data
US 2015/0283870 A1 Oct. 8, 2015

(30) Foreign Application Priority Data
Apr. 4, 2014 (DE) .......................... 10 2014 104 832

(51) Int. Cl.
*B60G 11/08* (2006.01)
*B60G 11/107* (2006.01)
*F16C 29/02* (2006.01)

(52) U.S. Cl.
CPC .............. *B60G 11/107* (2013.01); *B60G 11/08* (2013.01); *F16C 29/02* (2013.01); *B60G 2202/114* (2013.01); *B60G 2204/121* (2013.01)

(58) Field of Classification Search
CPC .................. B60G 11/107; B60G 11/08; B60G 2202/114; B60G 2204/121; F16C 29/02
See application file for complete search history.

(56) References Cited

U.S. PATENT DOCUMENTS

| 1,761,965 | A | * | 6/1930 | Blackmore | B60G 11/107 267/262 |
| 2,697,613 | A | * | 12/1954 | Giacosa | B01J 9/22 267/230 |
| 3,841,655 | A | * | 10/1974 | Schaeff | B60G 7/02 267/269 |
| 4,519,590 | A | * | 5/1985 | Wells | B60G 11/113 267/149 |
| 4,684,110 | A | * | 8/1987 | Sale | B60G 11/113 267/148 |
| 4,768,807 | A | | 9/1988 | McGibbon et al. | |
| 7,931,287 | B2 | * | 4/2011 | Dudding | B60G 11/113 280/124.175 |
| 8,091,763 | B2 | | 1/2012 | Drabon et al. | |
| 8,226,090 | B2 | | 7/2012 | Hammelmaier et al. | |
| 8,573,568 | B2 | * | 11/2013 | Henksmeier | B60G 9/003 267/260 |
| 8,925,909 | B2 | | 1/2015 | Drabon et al. | |
| 2005/0173882 | A1 | | 8/2005 | Drabon et al. | |

(Continued)

FOREIGN PATENT DOCUMENTS

| DE | 102009028574 | 2/2011 |
| DE | 102010060093 | 4/2012 |
| GB | 1 224 196 | 3/1971 |

*Primary Examiner* — Faye M Fleming
(74) *Attorney, Agent, or Firm* — Henry M. Feiereisen LLC

(57) ABSTRACT

A bearing component has a first structural component and a second structural component and supports a transverse leaf spring. The first structural component and the second structural component are connected with each other in a hinge-like fashion for rotation and surrounded by a sleeve. The first structural component has a hinge head which is positively held in a hinge head receptacle of the second structural component. The sleeve has a bellow section and protects the structural components of the bearing component from contamination.

9 Claims, 3 Drawing Sheets

(56) References Cited

U.S. PATENT DOCUMENTS

| | | | | |
|---|---|---|---|---|
| 2012/0098229 A1* | 4/2012 | Hochapfel | ............ | B60G 11/08 280/124.134 |
| 2012/0146308 A1* | 6/2012 | Fruhmann | ............ | B60G 11/08 280/124.175 |
| 2012/0146310 A1* | 6/2012 | Fruhmann | ............ | B60G 11/08 280/124.175 |
| 2012/0211959 A1 | 8/2012 | Hammelmaier et al. | | |
| 2014/0327196 A1* | 11/2014 | Hummelt | ............ | B60G 11/08 267/52 |

\* cited by examiner

TRANSVERSE LEAF SPRING BEARING UNIT AND TRANSVERSE LEAF SPRING ARRANGEMENT FOR A MOTOR VEHICLE

CROSS-REFERENCES TO RELATED APPLICATIONS

This application claims the priority of German Patent Application, Serial No. 10 2014 104 832.6, filed Apr. 4, 2014, pursuant to 35 U.S.C. 119(a)-(d), the content of which is incorporated herein by reference in its entirety as if fully set forth herein.

BACKGROUND OF THE INVENTION

The present invention relates to a transverse leaf spring bearing unit with a bearing component supporting a transverse leaf spring in a motor vehicle and a transverse leaf spring arrangement for a motor vehicle with a bearing component.

The following discussion of related art is provided to assist the reader in understanding the advantages of the invention, and is not to be construed as an admission that this related art is prior art to this invention.

Springs in the form of leaf springs are used for guiding and suspending vehicle wheels. A leaf spring is made of a resilient material such as metal and/or plastic and/or composite materials and has an elongated shape, typically a beam-shape, with a central region and at least two ends.

Wheel suspensions are employed as part of a chassis for connecting the wheels to the vehicle. Here, the wheel suspensions can be connected directly to the mostly self-supporting body. Depending on the embodiment, the wheel suspensions can also be arranged on a subframe connected to the body or on a chassis.

Light-weight and compact embodiments increasingly tend to employ a leaf spring, in particular for the rear vehicle wheel suspension. As so-called transverse leaf spring, the leaf spring is arranged horizontally and transversely to the longitudinal axis of the vehicle. In the central region, the transverse leaf spring is customarily connected to or held on the vehicle body by way of two bearing units. In this way, the two ends can perform a substantially vertical spring movement. The transverse leaf spring is operatively connected to wheel carriers or to a further component of the wheel suspension by way of end-side bearings disposed on the ends of the transverse leaf spring. The transverse leaf spring performs wheel-guiding functions, linkage functions as well as damping and load-bearing tasks and may also replace coil springs and/or stabilizers in the conventional wheel suspension.

The bearing units are designed so that the transverse leaf spring is rigidly affixed in the direction of the vertical vehicle axis, but is translationally movable in the direction of the transverse axis of the vehicle for rotation about an axis extending parallel to the longitudinal axis of the vehicle. In this way, the transverse leaf spring can be supported on the vehicle body, such that the ratio of the roll spring rate to the stroke spring rate can be adjusted, making insertion of a transverse stabilizer for stabilizing the vehicle unnecessary.

The use of transverse leaf springs becomes even more important with the increasingly light-weight construction of modern vehicles. The transverse leaf spring is installed so as to perform the functions of the body springs or coil spring as well as of the stabilizers. To take over the functions of body springs (stroke) and stabilizer (roll), the transverse leaf spring must ensure simultaneously a certain roll stiffness (resistance to opposing vertical movement of the wheels) and a certain stroke stiffness (resistance against vertical movement of the wheels in the same direction). As a result, the functions stroke spring rate and roll spring rate can be combined in a single component, a so-called integral spring. An important characteristic value is here the ratio of the roll rate to the stroke rate. This ratio must be greater than 1 so as to be able to integrate the stabilizer functions; ideally, the ratio is even 2 or greater. A large ratio between the roll stiffness and stroke stiffness ensures that the wheel suspension exhibits a high resistance to body roll of the vehicle body. At the same time, a sufficient flexibility in the vertical direction of movement is attained to provide a comfortable ride.

Fundamentally, the spring properties and the stiffnesses can be adjusted via the central bearing points, by which the transverse leaf spring is connected to the sprung mass of the vehicle. The relevant parameter is here the mutual spacing between the bearing units in the longitudinal direction of the transverse leaf spring. The roll rate can be set by way of the spacing. However, depending on the design of the chassis, only a limited ratio of roll rate to stroke rate of less than 2 is possible by varying the spacing between the bearing units. However, this is insufficient for the optimal integration of the stabilizer functions. It is therefore necessary to design the bearing technology so that the bearing units are constructed very stiff in the z-direction, but are easily movable in the direction of rotation. This objective cannot be implemented, at least not sufficiently, with conventional rubber bearings, possibly resulting in bearing rupture.

It would therefore be desirable and advantageous to obviate prior art shortcomings and to provide a transverse leaf spring bearing unit with a functionally improved bearing component for supporting a transverse leaf spring, with which a sufficiently large ratio of roll rate to stroke rate can be implemented, as well as a transverse leaf spring arrangement for a motor vehicle with such a transverse leaf spring bearing unit.

SUMMARY OF THE INVENTION

According to one aspect of the present invention, a transverse leaf spring bearing unit has a bearing component for supporting a transverse leaf spring in a motor vehicle, wherein the bearing component includes a first structural component, a second structural component rotatably connected to the first structural component, a sleeve surrounding the first structural component and the second structural component, a counter-bearing associated with the bearing component, and a retaining member encompassing the bearing component and the counter-bearing, wherein the transverse leaf spring is installed between the bearing component and the counter-bearing.

Advantageous embodiments of the transverse leaf spring bearing unit and its bearing component are recited in the dependent claims.

In the transverse leaf spring bearing unit, a counter-bearing is associated with the bearing component. The bearing component and the counter-bearing are configured to accommodate between them a transverse leaf spring. The bearing component and the counter-bearing are encompassed by a retaining member, by which the transverse leaf spring bearing unit can be attached to a subframe or a vehicle body. The counter-bearing can be a damper body, in particular a damper body made of elastomer or a damper body made of foamed polyurethane. In particular, the damper body of the counter-bearing consists of a material that is softer than elastomeric rubber. This selection of materials permits transverse movements of the transverse leaf spring, without reducing the pretension of the support.

The bearing component absorbs both the load of the moving parts as well as the force of movement and serves as a bearing having one degree of freedom. The first structural component and the second structural component are positively connected with each other for rotation. The connection is such that the first structural component has a limited pivoting range about the x-axis. This rotational movability in the x-direction or around the x-axis (longitudinal axis of the vehicle or travel direction of the vehicle) enables a higher stroke rate. The roll rate in a transverse leaf spring arrangement in the vehicle is adjusted via the spacing between the transverse leaf spring bearing units, whereas the stroke rate is adjusted via the rotational mobility of the bearing units by way of the bearing components according to the present invention. Two transverse leaf spring bearing units for securing the transverse leaf spring are customarily provided. Overall, the embodiment according to the invention enables the implementation of in practice sufficiently large roll and stroke rates. In addition, the bearing component according to the invention is maintenance-free, cost-effective and has a very long life expectancy.

The bearing component according to the invention is designed like a hinge bearing. The first structural component has a hinge head, which is shaped cylindrical or roller- or barrel-shaped. The second structural component has a hinge head receptacle. The hinge head is held positively in the hinge head for limited rotation. The bearing component is stiff in the vertical axis or the z-axis of the vehicle for supporting the transverse leaf spring on the auxiliary frame or on the chassis. The bearing component has limited rotation movement in the x-direction of the vehicle, in order to take part in or execute the movement of the transverse leaf spring during roll and stroke movements.

In a technically advantageous embodiment, the bearing component has low translational movability in the y-axis of the motor vehicle. In this way, effective changes in length of the transverse leaf spring can be compensated during roll and stroke movements.

The bearing component provides the stiffness in the z-axis due to the hardness of the material or the materials used for the individual components of the bearing component. Preferably, the structural components are made of plastic.

The first structural component has a base body connected to the hinge head. The second structural component has a base body connected to the hinge head receptacle. Preferably, the hinge head and the base body of the first structural component and the hinge head receptacle and the base body of the second structural component are integrally formed and made of the same material. The distance between the bearing foot of the bearing component and the central point in the hinge head of the first structural component can be adjusted by designing or setting the dimensions of the base body, in particular the length of the base body of the second structural component. The transverse mobility of a transverse leaf spring arrangement can be influenced in this way.

According to one aspect of the bearing component, the sleeve has a bellow section. The entire sleeve surrounds the first structural component and the second structural component and seals the structural components against the environment. The sleeve protects the movable structural components against foreign objects, in particular from contamination and damaging environmental effects, such as water spray, dust, dirt, salt and the like. The bellow section provided the sleeve with elastic properties, which participate in the movement of the bearing component.

In an advantageous embodiment, the sleeve has a base body. The first structural component or the second structural component is held in a receptacle of the base body. Depending on the design of the bearing component, the base body of the sleeve can be selectively associated with the first structural component or the second structural component in order to accommodate them in the receptacle of base body.

Furthermore, the sleeve has a collar portion. With the collar portion, the sleeve covers, depending on the design of the bearing component, either the first or the second structural component.

Another aspect of the invention relates to a transverse leaf spring arrangement for a motor vehicle. The transverse leaf spring arrangement includes a transverse leaf spring arranged transversely with respect to the vehicle and connected to the vehicle body by at least one transverse leaf spring bearing unit. The transverse leaf spring bearing unit has a retaining member. The transverse leaf spring is received in the retaining member between a bearing component according to the invention and a counter-bearing. The bearing component is characterized by the first structural component and the second structural component cooperating in a hinge-like fashion, which are rotatably connected to each other and surrounded by a sleeve.

The bearing component is stiff in the vehicle vertical axis (z-axis of the vehicle). Furthermore, the bearing component is torsionally flexible. Advantageous properties of the bearing component according to the present invention are its excellent spring and functional properties and the absence of maintenance requirements. Furthermore, the bearing component is cost-effective and durable. In particular, the bearing component enables, when integrated into the transverse leaf spring bearing unit, a compensation of the transverse contraction of the transverse leaf spring.

The second structural component directly or indirectly contacts with its flat outer side, customarily the bottom, the top side of the transverse leaf spring. An indirect contact is in accordance with the invention to be understood as an embodiment where the base body of the second structural component is positioned in the receptacle of the base body of the sleeve. With direct contact, the second structural component comes into direct contact with the top of the transverse leaf spring.

The first structural component has a flat contact surface of the outside of its base body. The first structural component contacts the chassis or the vehicle body or a load-bearing subframe with the contact surface.

In a functionally advantageous manner, the bearing component according to the invention is arranged between the chassis and the transverse leaf spring. Preferably, the arrangement is clamped together by a lower counter-bearing having a simple design and held together and attached to the vehicle with a bracket-shaped retaining member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
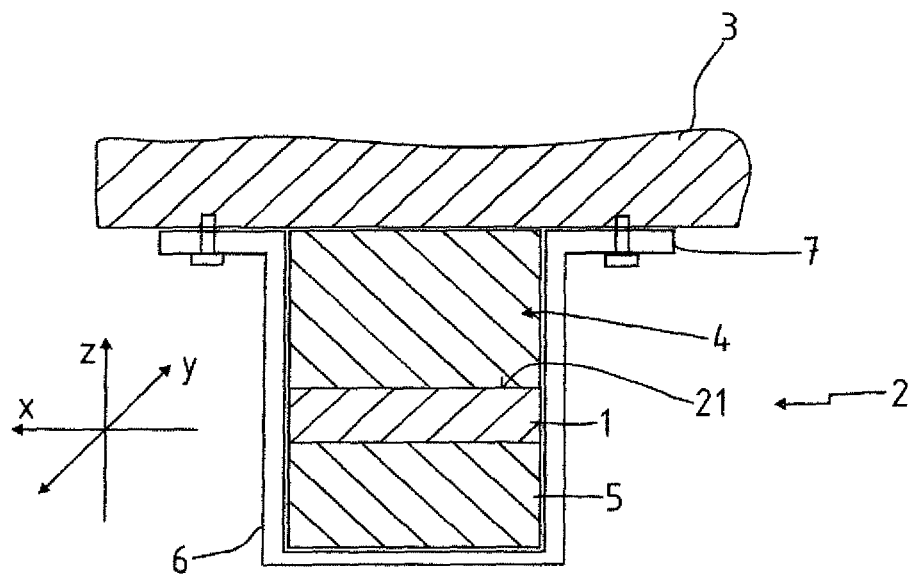
FIG. 1 shows a simplified diagram of a transverse leaf spring arrangement for a motor vehicle with a transverse leaf spring bearing unit according to the present invention.
Figure 2:
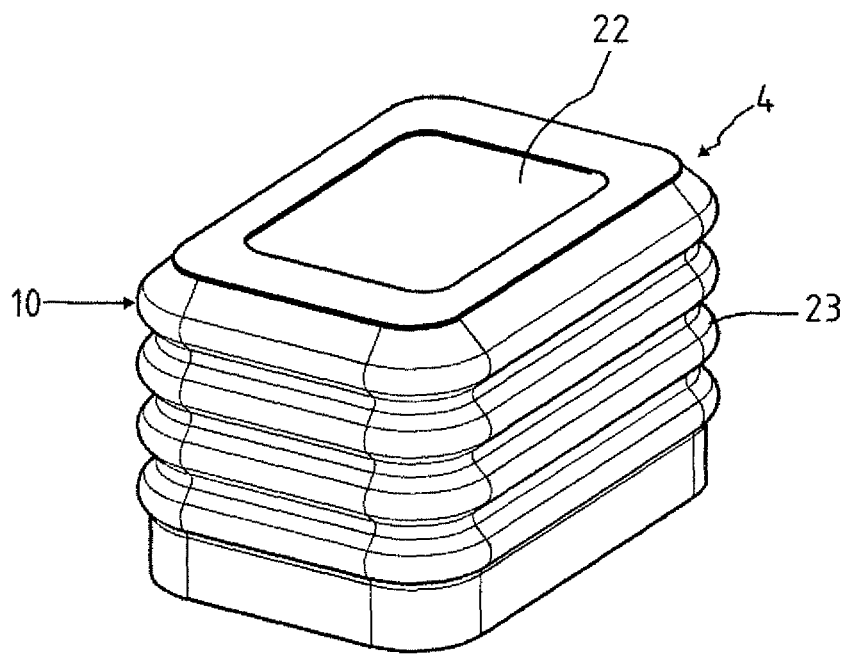
FIG. 2 shows a bearing component in a perspective representation.
Figure 3:
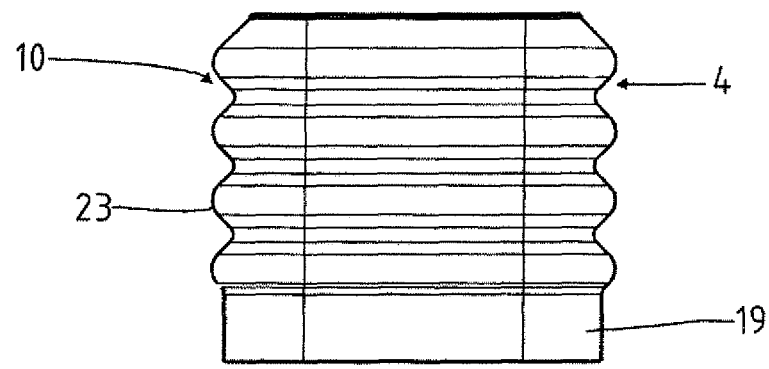
FIG. 3 shows the bearing component in a front view.
Figure 4:
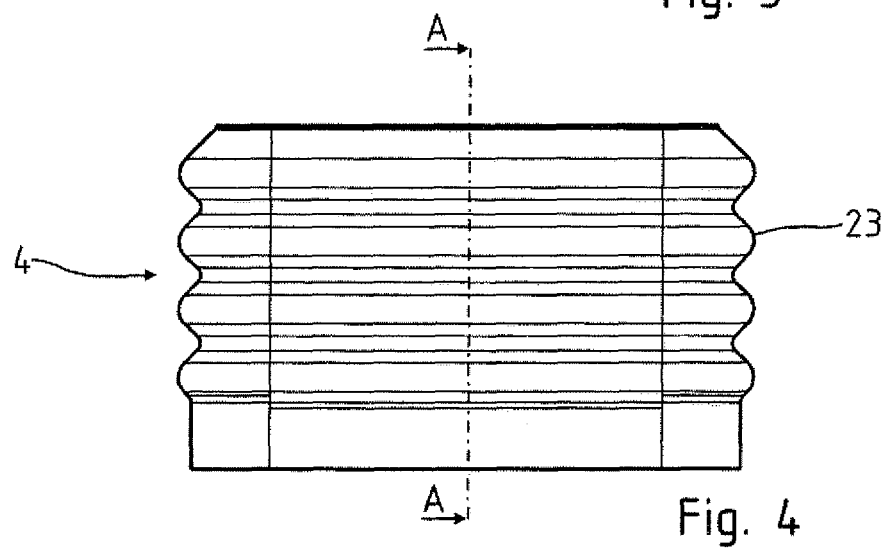
FIG. 4 shows the bearing component in a side view.
Figure 5:
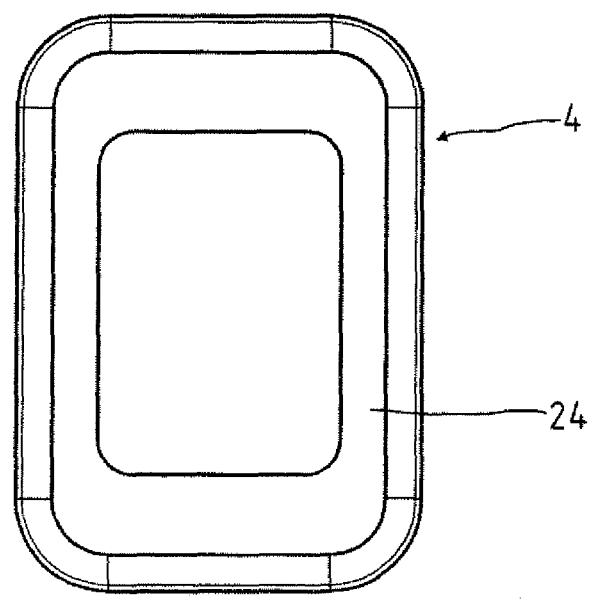
FIG. 5 the bearing component in a top view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown schematically a section of a transverse leaf spring arrangement for a motor vehicle with a transverse leaf spring 1 arranged transversely to the motor vehicle and connected to the vehicle body 3 via a transverse leaf spring bearing unit 2. One component of the transverse leaf spring bearing unit 2 is a bearing component 4, as shown in more detail in the FIGS. 2 to 7.

FIG. 1 shows in addition in a perspective view a vehicle coordinate system to indicate the axes inside a motor drive and the transverse leaf spring bearing unit 2, respectively. The x- and y-axes are located in a horizontal plane (=road surface). The x-axis (longitudinal axis of the vehicle) is located in the longitudinal center plane of the vehicle and is oriented horizontally forward, i.e. in the direction of movement of the vehicle. The y-axis (transverse axis of the vehicle) is perpendicular to the longitudinal center plane of the vehicle and points transversely to the direction of movement of the vehicle. The z-axis (vertical axis of the vehicle) is perpendicular to the x-y plane of the vehicle and points with its positive direction upward.

A counter-bearing 5 is associated with the bearing component 4. The transverse leaf spring 1 is incorporated between the bearing member 4 and the counter-bearing 5. The transverse leaf spring bearing unit 2 is attached to the vehicle body 3 or to a subframe via a bracket-shaped retaining member 6. The bearing member 4 and the counter-bearing 5 with the received transverse leaf spring 1 is hereby encompassed by the retaining member 6 and secured on the vehicle body 3 with fastening means 7.

The bearing component 4 is an important component of the transverse leaf spring bearing unit 2 and includes a first structural component 8 and a second structural component 9. The first structural component 8 and the second structural component 9 form a hinged joint and are rotatably connected to each other and surrounded by a sleeve 10. The sleeve 10 serves to protect against foreign objects, particularly contamination of the connecting region between the first structural component 8 and the second structural component 9, which are positively connected to each other and can rotate relative to each other.

Figure 6:
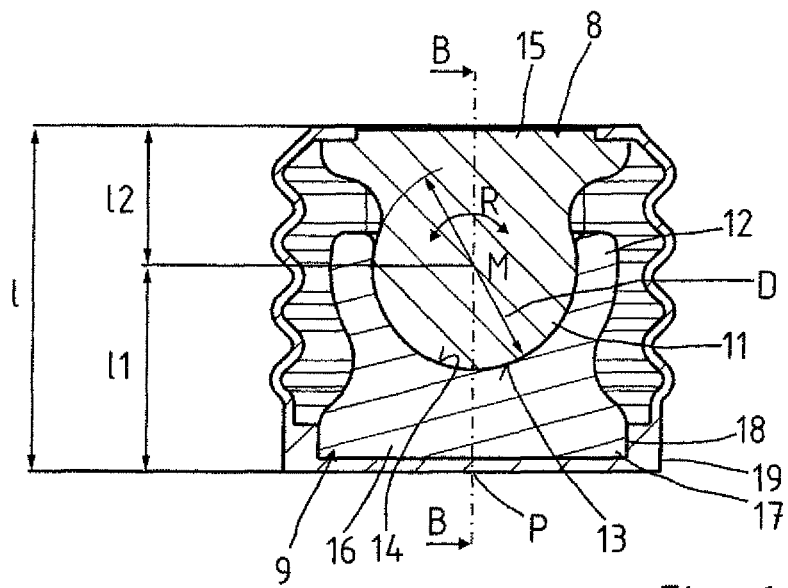
FIG. 6 shows a section through the diagram of FIG. 4 taken along the line A-A.

The first structural component 8 has a hinge head 11. The hinge head 11 has a cylindrical shape with a circular base surface, as illustrated in FIG. 6. The diameter is indicated with D and the center with M. The x-axis extends through the center M. The rotational mobility or rotational movement of the first structural component 8 relative to the second structural component 9 about the x-axis is indicated by the arrow R. Here, the hinge head 11 pivots in a hinge head receptacle 12 of the second structural component 9.

Figure 7:
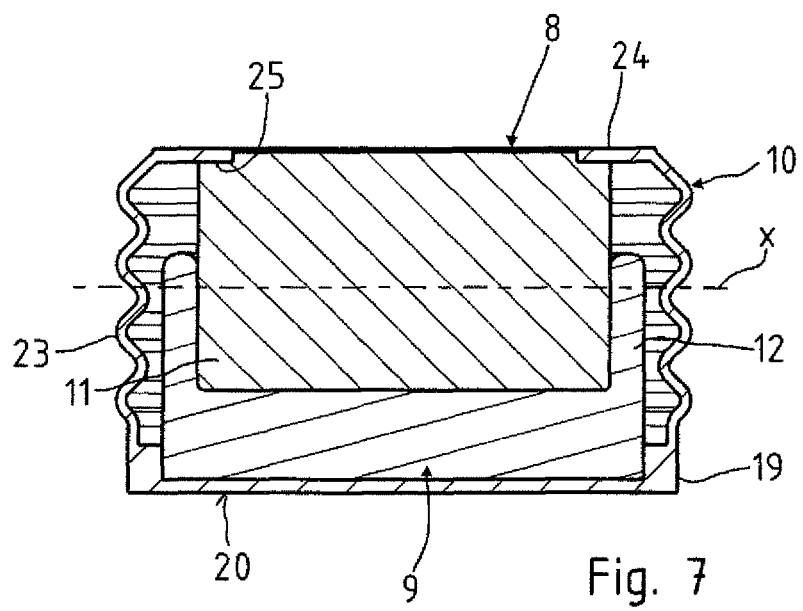
FIG. 7 shows a section through the diagram of FIG. 6 taken along line B-B.

FIG. 7 shows a longitudinal section through the bearing component 4 taken along the line B-B of the diagram of FIG. 6.

The second structural component 9 has the hinge head receptacle 12. The hinge head receptacle 12 is cup-shaped with an inner contour 13 which is designed complementary to the outer contour 14 of the hinge head 11, so that the hinge head 11 is positively held in the hinge head receptacle 12 and received for limited rotation about the x-axis of the motor vehicle.

An upper base body 15 (with reference to the image plane) is integrally connected to and made of the same material as the hinge head 11 of the first structural component 8. The second structural component 9 also has an integrally formed base body 16 connected to the hinge head receptacle 11 and made of the same material. The first structural component 8 and the second structural component 9 are preferably made of wear-resistant plastic.

The lower portion 17 of the base body 16 of the second structural component 9 is held in a receptacle 18 of the sleeve 10. The receptacle 18 is formed in a lower base body 19 of the sleeve 10 facing the transverse leaf spring. The bottom side 20 of the base body 19 of the sleeve 10 forms a flat contact surface of the bearing component 4, with which the bearing component 4 contacts the top surface 21 of the transverse leaf spring 1. The top side 22 of the first structural component 8 is also flat and forms the contact surface with which the bearing component 4 contacts the vehicle body 3 and a load-bearing subframe.

The overall height I of the component 4 defines the distance between the vehicle body 3 and the top 21 of the transverse leaf spring 1. The transverse mobility of the transverse leaf spring 1 in the y-direction is determined by the distance I1 of the foot point P to the joint center M. The greater the distance I1, the greater is the transverse mobility. The overall height I is composed of the distance I1 between the foot point P and the center M, and the distance I2 between the center M and the top side 22 of the first structural component 8. The distance I1 is greater than the distance I2 so that the center M is located in the upper half of the bearing component 4.

The sleeve 10 forms an enclosure for the first structural component 8 and the second structural component 9. The major part of length of the sleeve 10 in the z-direction is implemented as a bellow 23. In this way, the sleeve 10 can advantageously participate in the rotational and/or pivotal movement of the bearing component 4 and/or of the first structural component 8 relative to the second structural component 9. In particular, the bellow section 23 is made of rubber or plastic. The bellow section 23 can of course also be made of a flexible metal material.

The sleeve 10 covers the first structural component 8 with an upper collar portion 24. A recess 25 is provided in the top side 22 of the base body 15 of the first structural component 8. The sleeve 10 rests in the recess 25 with the free end of the collar portion 24. The outer surfaces of the collar portion 24 form a planar extension to the top side 22 of the base body 15 of the first structural component 8.

The bearing component 4 enables limited rotational movement about the x-axis, which increases the stroke. The transverse leaf spring bearing unit 2 can participate in the movement of the transverse leaf spring 1 during stroke and roll movements through rotation about the x-axis. A corresponding degree of freedom in the y-direction ensures that the change in length of the transverse leaf spring 1 during stroke and roll movements in the y-axis is compensated inside the bearing component 4. In the z direction, the bearing component 4 is stiff to support the transverse leaf spring 1 on vehicle body 3 or the subframe.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transverse leaf spring bearing unit has a bearing component for supporting a transverse leaf spring in a motor vehicle, wherein the bearing component comprises
   a first structural component,
   a second structural component rotatably connected to the first structural component,
   a sleeve surrounding the first structural component and the second structural component,
   a counter-bearing associated with the bearing component, and
   a retaining member encompassing the bearing component and the counter-bearing,
   wherein the transverse leaf spring is installed between the bearing component and the counter-bearing.

2. The transverse leaf spring bearing unit of claim 1, wherein the first structural component comprises a hinge head and the second structural component comprises a hinge head receptacle, with the hinge head being positively held in the hinge head receptacle.

3. The transverse leaf spring bearing unit of claim 2, wherein the first structural component comprises a first base body connected to the hinge head and the second structural component comprises a second base body connected to the hinge head receptacle.

4. The transverse leaf spring bearing unit of claim 1, wherein the sleeve comprises a bellow section.

5. The transverse leaf spring bearing unit of claim 1, wherein the sleeve has a base body and the first structural component or the second structural component is held in a receptacle in base body of the sleeve.

6. The transverse leaf spring bearing unit of claim 1, wherein the sleeve comprises a collar portion and wherein the collar portion covers the first structural component or the second structural component.

7. A transverse leaf spring arrangement for a motor vehicle having a transverse leaf spring arranged transversely to the motor vehicle and connected to a vehicle body by way of at least one transverse leaf spring bearing unit having a bearing component supporting the transverse leaf spring, wherein the bearing component comprises
   a first structural component,
   a second structural component rotatably connected to the first structural component,
   a sleeve surrounding the first structural component and the second structural component,
   a counter-bearing associated with the bearing component, and
   a retaining member encompassing the bearing component and the counter-bearing,
   wherein the transverse leaf spring is installed between the bearing component and the counter-bearing.

8. The transverse leaf spring arrangement of claim 7, wherein the first structural component is pivotable about a longitudinal axis of the vehicle to a limited extent.

9. The transverse leaf spring arrangement of claim 7, wherein the transverse leaf spring is secured by two transverse leaf spring bearing units,
   wherein a roll rate of the motor vehicle is adjustable via a spacing between the two transverse leaf spring bearing units, and
   wherein a stroke rate is adjustable with the bearing components via a rotational mobility of the transverse leaf spring bearing units.

* * * * *